Feb. 11, 1941.  C. A. SIMMONS  2,231,429

REVERSE LIGHTING MECHANISM FOR AUTOMOBILES

Filed Oct. 24, 1939  2 Sheets-Sheet 1

Inventor

C. A. Simmons

By Clarence A. O'Brien
and Hyman Berman
Attorneys

Feb. 11, 1941. C. A. SIMMONS 2,231,429
REVERSE LIGHTING MECHANISM FOR AUTOMOBILES
Filed Oct. 24, 1939 2 Sheets-Sheet 2
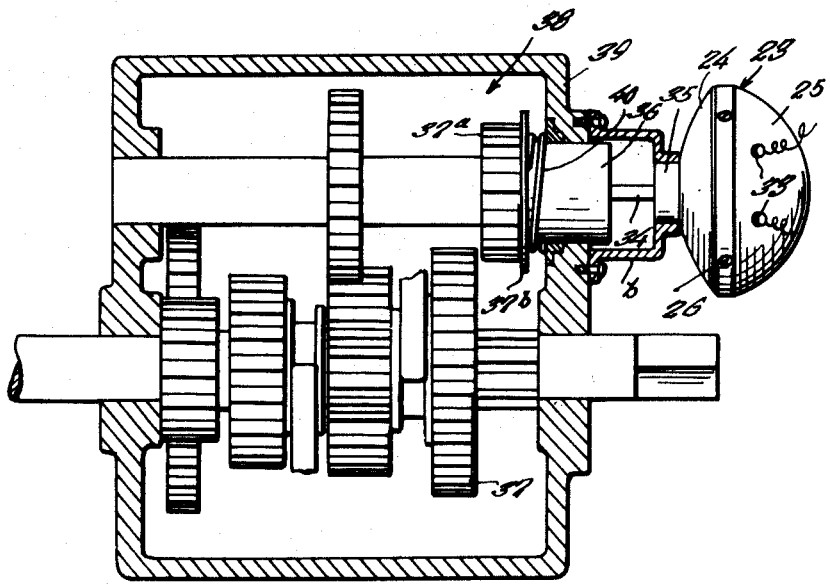
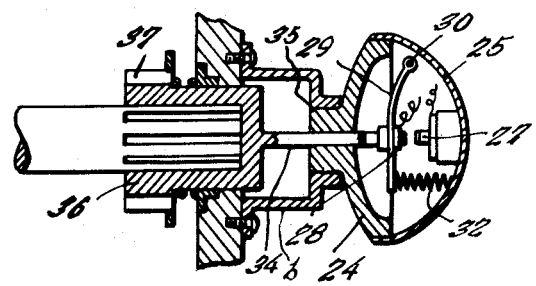
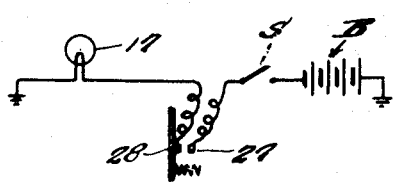
Inventor
C. A. Simmons
By Clarence A. O'Brien
and Hyman Berman
Attorneys Patented Feb. 11, 1941

2,231,429

UNITED STATES PATENT OFFICE 2,231,429

REVERSE LIGHTING MECHANISM FOR AUTOMOBILES

Charles A. Simmons, Shreveport, La.

Application October 24, 1939, Serial No. 301,085

2 Claims. (Cl. 200—59)

This invention relates to a light adapted to be used at the rear end of an automobile, and particularly to an improved switch designed for use in connection with motor vehicle transmissions so that when the reverse gear of the transmission is shifted into active position, the switch will be closed for completing the circuit to the aforementioned light; and the invention together with its objects and advantages will be best understood from a study of the following description taken in connection with the accompanying drawings wherein:

Fig. 3 is a view showing in section a transmission casing with the transmission gearing shown in elevation and a switch associated with the transmission in accordance with the present invention.

Fig. 4 is a detail sectional view through the switch casing, and showing the manner in which the switch is associated with the reversing gear of the transmission, and Fig. 5 is a wiring diagram.

Figure 1:
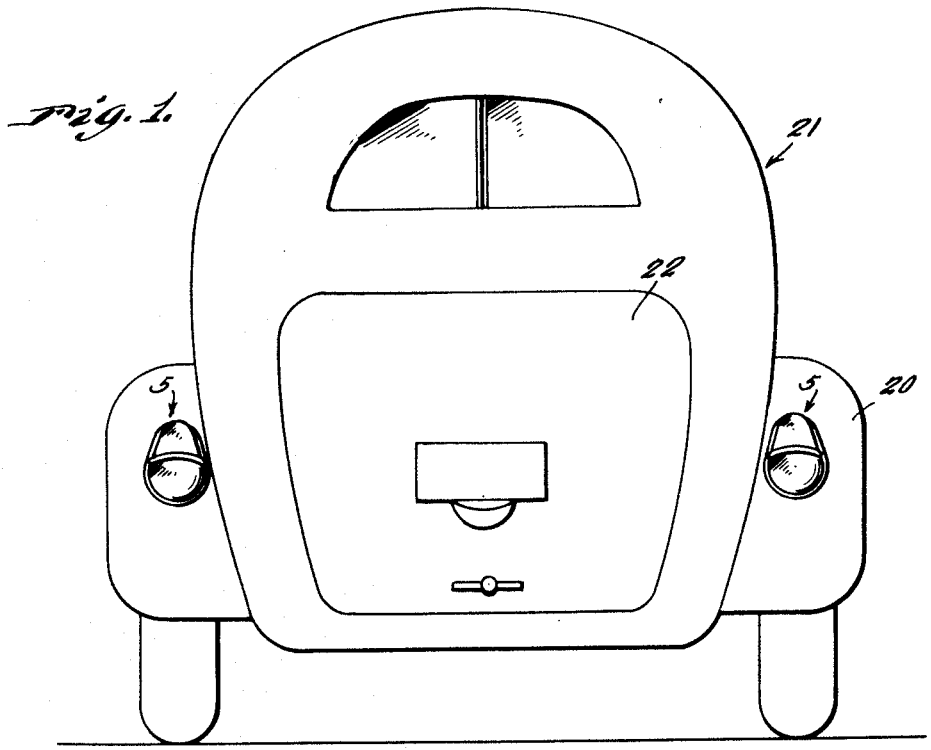
Figure 1 is a rear elevational view of an automobile showing rear lights mounted thereon in accordance with the present invention.

Referring more in detail to the drawings, it will be seen that in accordance with the present invention, there is provided one or more light casings each of which includes essentially a transparent housing 5, a mounting plate 6 and a retaining frame 7. The frame 7 is bolted or otherwise secured to the mounting plate 6 at the marginal edges thereof and as indicated generally at 8. The peripheral wall of the housing 5 at the open side thereof is provided with a bead or rim 9 with which is engaged a continuous flange 10 provided at the inner edge of the retaining frame 7 so that through the medium of the bead or flange 9 and the flange 10 the housing 5 is held in proper position on the mounting plate 6.

Figure 2:
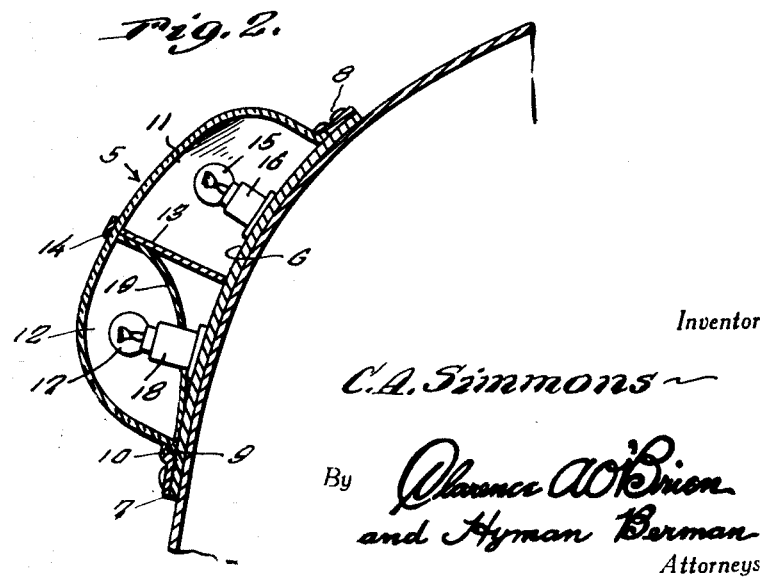
Fig. 2 is a sectional view through a light embodying features of the present invention and a portion of the body of the automobile on which the light is mounted.

The housing 5 is also preferably divided into upper and lower compartments 11 and 12, respectively, through the medium of a partition 13, as shown in Fig. 2.

Also exteriorly of the casing 5 is a finishing band 14 that at its ends is secured to the retaining frame 7 in any suitable manner as for example, by being integral therewith; the band 14 being located in the region of the partition 13 as also will be clear from a study of Fig. 2.

The portion of the casing 5 forming walls for the compartment 11 may be colored red or in lieu thereof the incandescent bulb 15 mounted in a socket 16 arranged within said compartment 11 may be colored red.

Preferably, the portion of the casing 5 complementing the mounting plate 6 in forming the compartment 12 is clear so a clear white light will be directed downwardly toward the road surface from the bulb 17 fitted in the conventional lamp socket 18 also mounted within the compartment 12.

Also for directing the light from the lamp 17 downwardly onto the road surface there is provided within the compartment 12 a reflector 19.

As suggested in Fig. 1, a light such as shown in Fig. 2 and described in detail may be mounted on each of the rear fenders 20 of an automobile indicated generally by the reference numeral 21, and a similar light might also be located on the trunk door 22 if found desirable.

As suggested in Fig. 5 the light or lights as the case may be, may be arranged in a battery circuit, the battery of which is indicated by the reference numeral B and for this circuit there may be provided a hand switch S as shown.

A salient feature of the present invention is the provision of a switch 23.

The switch 23 comprises a two-part casing the parts or sections of which are indicated by the reference numerals 24 and 25 respectively. The casing sections 24, 25 have a telescoping fit as shown in Fig. 4, and are secured together through the medium of screws or other fastening elements 26.

When assembled, the casing is of somewhat bulbous shape and accommodates therein a stationary switch contact 27 and a movable contact 28. The contact 28 is mounted on a spring bracket 29 anchored at one end within the casing section 25 as at 30 and at its opposite end having connected therewith a spring 32 also suitably anchored in the casing section 25.

As shown in Fig. 4, the spring 32 normally acts to urge the contact 28 away from the contact 27.

The contacts 27 and 28 are connected by suitable wiring with terminals 33 mounted on the casing section 25 as best shown in Fig. 3, and to which said terminals the wires of the circuit are connected, as for example, to the terminal 33 for the contact 28 there is connected a wire leading from the lamp bulb 17, while connected to the terminal 33 for the contact 27 is a wire leading from one side of the aforementioned manually operated switch S (see Fig. 5).

The casing of the switch 23 may be supported from the transmission housing 39 in any suitable manner, and in the present instance for that purpose there is illustrated a suitable bracket b secured to the transmission housing 39 by screws or other fastening elements and having an annular part accommodating the boss 35 of switch casing section 24. In this connection it will be understood that the casing of the switch 23 is made fast to the bracket b in any suitable manner so as to secure the casing of the switch 23 in a fixed position.

Also as best shown in Fig. 4, associated in any suitable manner with the arm 29 and contact 28 mounted thereon is a plunger rod 34 that works through the boss 35, and this plunger 34 is made integral with one end of the hub 36 of the idler gear 37a of any suitable automotive transmission gearing which is shown in Fig. 3, indicated generally by the reference numeral 38, and also embodies a reversing gear 37.

In connection with the above, it will be noted that interposed between the idler gear 37a and the adjacent wall of the transmission housing 39 is a spring 40 that acts to normally hold the idler gear 37a in a position shown and consequently in cooperation with the spring 32 the contact 28 out of engagement with the contact 27 so that normally, even with the switch S, for example, shown in Fig. 5 closed, the circuit through the lamp or lamps 17, as the case may be, is interrupted.

From the foregoing it will be apparent that when it is desired to illuminate the road at the rear of the vehicle incidental to a reversing of the vehicle, the operator, in the event a circuit such as shown in Fig. 5, is employed, closes the switch S. Consequently, when the reverse gear 37 of the transmission is shifted to active position for effecting a reversing of the automobile, said gear in meshing with idler 37a will engage flange 37b of the idler gear 37a causing the latter to shift against the action of spring 40, and plunger 34 to move inward of the switch casing 23. Consequently, arm 29 in opposition to the spring 32 will rotate on its pivot 30 in a counter-clockwise direction forcing the contact 28 carried by said arm into engagement with the contact 27, thus completing the circuit through the lamp or lamps 17 as the case may be for illuminating the roadway at the rear of the vehicle. Obviously the switch contacts 28 and 27 will remain engaged as long as the vehicle is in reverse speed. When a reverse movement of the vehicle is completed, the idler gear 37a in response to the spring 40 will tend to move to the position shown in Fig. 4, and spring 32 will also act in conjunction with the expansive action of the spring 40 to move the arm 29 also to the position shown in Fig. 4 thus causing the contact 28 to move out of engagement with the contact 27, and thereby interrupt the circuit through the lamp or lamps 17, as the case may be.

It is thought that a clear understanding of the operation, utility and advantages of an invention of this character will be had without a more detailed description.

Having thus described the invention, what is claimed as new is:

1. In combination with a vehicle transmission embodying a housing having an opening therein, a shaft having an end extending into said opening and an idle gear having a hub slidably arranged on said end of the shaft, a casing connected with the housing and in communication with the opening, switch means in the casing, a plunger connected with the hub and means whereby the gear and its hub are shifted when the transmission is placed in reverse, said shifting movement of the hub causing the plunger to actuate the switch means.

2. In combination with a vehicle transmission including a housing having an opening therein, a shaft having one end entering the opening and an idle gear having a hub slidably arranged on said end of the shaft and extending through the opening and said gear having a part thereon for engagement by another gear when the transmission is placed in reverse for moving the gear and its hub outwardly, a casing attached to the housing and enclosing the projecting end of the hub, a switch housing connected with the casing and containing switch means and a plunger connected with the hub and passing into the switch casing to move the switch means to operative position when the idle gear and its hub are moved outwardly when the transmission means are placed in reverse.

CHARLES A. SIMMONS.